Feb. 9, 1965 J. F. COCHRAN 3,168,782
METHOD AND APPARATUS FOR FABRICATING COMPOSITE STRUCTURES
Original Filed May 28, 1958

INVENTOR.
JOE F. COCHRAN

BY

ATTORNEY

United States Patent Office 3,168,782
Patented Feb. 9, 1965

3,168,782
METHOD AND APPARATUS FOR FABRICATING COMPOSITE STRUCTURES
Joe F. Cochran, Fort Worth, Tex., assignor to General Dynamics Corporation (Convair Division), San Diego, Calif., a corporation of Delaware
Continuation of abandoned application Ser. No. 738,366, May 28, 1958. This application May 17, 1962, Ser. No. 195,524
12 Claims. (Cl. 29—471.1)

The present invention relates generally to an improved method and apparatus for the braze bonding of metal components into a composite structure. More particularly the invention, which is a continuation of application Serial No. 738,366, filed May 28, 1958, now abandoned, relates to an improved method and apparatus for the braze bonding of metals which readily react with atmospheric elements, such as carbon, oxygen, nitrogen when said metals are heated to temperatures necessary to effect a braze of the quality required in structural components of supersonic aircraft and missiles.

Modern supersonic aircraft and missile structures are characterized by a high strength-to-weight ratio and resistance to high temperature demands made upon them during operation of the vehicle of which they are a component part. It has been found that stainless-steel and titanium, cellular-cored sandwich panel brazed constructions are particularly adapted to meet the requirements of this class of flying vehicles when a high quality, integral bond is effected between the component elements of such panels during the manufacture thereof.

It is generally recognized by those skilled in the art, that one of the principal causes of inferior quality brazed panels is the presence of atmospheric contaminants within a panel, when it is raised to temperatures capable of effecting braze bonding thereof. Although several methods and apparatus exist and are presently employed in the brazing of stainless-steel panels, there is still an excessive number of inferior structures being scrapped during production for reasons directly related to atmospheric contamination; titanium, for example, is sufficiently sensitive to atmospheric contamination that contemporary brazing methods and apparatus are impractical to the point of being virtually useless for brazing titanium panels of required quality and structural integrity.

Heretofore the brazing of such panels has been accomplished generally in the following manner: enclosing the panel components, reference tooling and supporting accessories within a welded, evacuated, brazing vessel or box and positioning the brazing box in a large brazing retort. Both brazing box and retort are then purged with an inert gas, after which a positive gas pressure is introduced into said retort and a vacuum is effected in the brazing box. The retort, containing the brazing box is then placed within a large brazing furnace for the normal brazing cycle.

The prime disadvantage of the above method is that the expensive, time-consuming purging of the brazing retort often fails to accomplish the desired result, viz., creating an atmospheric shroud in the retort which is virtually void of atmospheric contaminants. Since atmospheric contaminants are present, it follows that if the vacuum box develops a leak along one of the welded seams, which is a frequent occurrence, the contaminants within the retort will, therefore, due to the pressure differential, be admitted into the brazing box; hence into contact with the panel itself, thereby, in all probability, rendering it unsatisfactory for its intended purpose.

Another disadvantage of the aforesaid method resides in the fact that the graphite refractory material employed in the fabrication of the reference tooling, is inherently porous and contains air with its related atmospheric contaminants, which, when heated during the brazing process, expand and are emitted from the graphite reference tooling and onto the panel workpiece.

Yet another inherent disadvantage of the above mentioned method is the inconvenience of handling the heavy and cumbersome retort involved in brazing a relatively small, lightweight panel.

Still other disadvantages lie in the excessive cost entailed in purging the large retort; the provision of manufacturing and heating ovens large enough to accommodate the retort, and in the excessive use of manufacturing floor space involved.

It is, therefore, the primary object of the present invention to provide an improved means for manufacturing of braze-bonded, cellular-cored sandwich panel constructions of modern aircraft and missile quality, having exceptional strength-to-weight ratios, optimum heat resistance characteristics, and with a minimum number of rejections in the production process, that are due to atmospheric contamination during the brazing operation.

Another object of the present invention is to provide improved apparatus for effectively sealing a sandwich panel workpiece within an inert environment which is substantially free of atmospheric contaminants.

Still another object resides in the provision of an improved method and apparatus for braze bonding metal components which effectively eliminates a prior necessity for the use of a retort implement in the brazing process.

Yet another object of the invention is the provision of an improved method and apparatus for brazing together two or more pieces of metal in such manner that they consistently yield bonds having high quality physical properties.

A further object of the present invention is to provide an improved method and apparatus of the above class and character which will effectively and economically accomplish its intended purpose.

Other objects and features of the present invention will be readily apparent to those skilled in the art from the following specification and appended drawings wherein is illustrated a preferred form of the invention, and in which.

Figure 1:
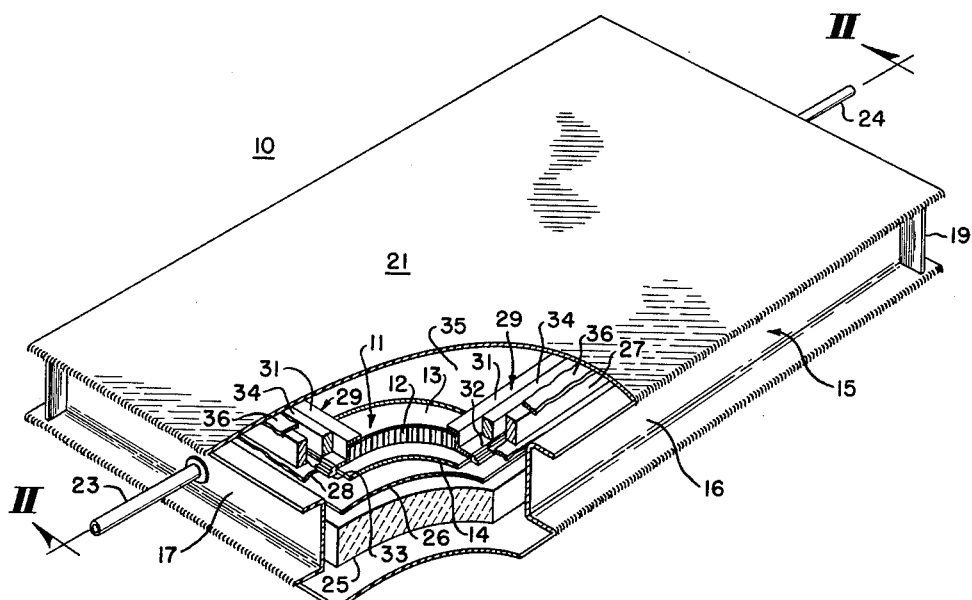
FIGURE 1 is a partially cut-away, perspective view of a vacuum apparatus in accordance with the present invention, shown as enveloping a typical, flat, aircraft, sandwich panel composite structure.

Particular reference is now made to FIGURE 1 of the drawings wherein is illustrated a vacuum brazing box, indicated generally by the numeral 10, which encloses a typical flat cellular cored sandwich panel 11. Such typical sandwich panel, which may be flat (as shown), or may involve simple or compound curvature, comprises essentially a core material 12 of light gauge, ribbon-like stainless steel, formed into a lattice-like, cellular structure or honeycomb, and two sheets of stainless steel facing plates 13, and 14, disposed one on either side of core 12. The panel construction may, as required, also include various edge members, doublers, and the like (not shown). Prior to its location within brazing box 10, panel 11 is assembled in suitable tooling fixtures, with appropriate brazing material which may be in thin sheet form (not shown) disposed between the core 12 and facing plates 13 and 14, and tacked brazed at appropriate points, thereby affixing the component parts in their proper relationship for final association in the brazing operation. Panel 11 is then placed in the vacuum brazing box implement 10.

Vacuum brazing box 10 comprises an external frame 15 of generally rectangular configuration having longitudinal side channel members 16, transverse end channel members 17 and 18 and reinforcing gussets 19. Frame 15 carries a pair of flexible vacuum sheets 21 and 22 made of light gauge stainless steel which are welded in place at the edges of side members 16 and end members 17 and 18, the lower vacuum sheet 22 being first welded in place and the upper vacuum sheet 21 being affixed after the contents of box 10 have been placed therein, as will be discussed in detail hereinafter. An inlet tube 23 and an outlet tube 24 are suitably affixed respectively to end members 17 and 18 and have communication with the interior of box 10 for a purpose to be described.

Associated with vacuum box 10 and contained therewithin resting on lower vacuum sheet 22 is a rectangular graphite brazing block 25, which is essentially a refractory platen or form block and serves as a support and to control the contour of panel 11 during the brazing operation. Brazing block or platen 25 has placed thereupon a partition sheet 26 which with an internal frame member 27 defines a compartment for containing panel 11 and certain reference or locating tooling to be described. Partition sheet 26 may be made of any suitable material, such as stainless steel and is of sufficient size as to extend beyond the perimeter of internal frame 27 on all sides and serves to effectively insulate the compartment defined by internal frame 27 from the atmospheric contaminants which may be present in pervious graphite base 25. Frame 27 is an integral rectangular structure, preferably made of elongated lengths of stainless steel, and rests upon a gas-permeable gasket or pad 28 made of suitable fibrous material which in turn rests on partition sheet 26. It is understood that any commercially available gasket having gas-permeable qualities may of course, be used herein, such as, for example, the commercial product "Fiberfax."

Within the area or compartment defined by internal frame 27, there is placed the pre-assembled panel 11 which will rest upon partition sheet 26. The lower facing plate 14 of panel 11 is larger in outline than core 12 or upper facing plate 13 and is of such dimensions as to extend beyond core 12 an appropriate amount on all four sides as to accommodate Z-section edge members 29 which peripherally surround core 12 and upper facing plate 13. As shown, the upper flanges 31 of edge members 29 overlie upper plate 13 and have their upper surfaces in the same plane as the upper edge surfaces of internal frame 27 while the lower flanges 32 of members 29 abut against a plurality of angle-type locator clips 33 suitably rigidly affixed to partition sheet 26. These serve as reference or locating tooling to physically locate panel 11 in its desired position and prevent inadvertent shifting thereof. Filler bars 34, usually fabricated of mild steel, are placed upon the lower flanges 32 of edge members 29 and are of such dimension that their upper surfaces are flush with the upper surfaces of edge members 29 and internal frame 27. A filler sheet 35, usually of stainless steel, is next placed so as to overlay upper facing plate 13, substantially filling the region between structural edge members 29. The filler sheet 35 is of the same thickness as the thickness of upper flanges 31 to provide an upper surface flush with the upper surface of the structural frame effected by edge members 29, filler bars 34, and internal frame 27. Thus a smooth working surface is provided over panel 11 which assists in the brazing operation. After the filler members are in place a second gas permeable gasket or permeable pad 36 is placed upon the upper edge surfaces of internal frame 27. The upper vacuum sheet 21 is then placed upon external frame 15 and welded in airtight manner thereto to complete the enclosure.

Figure 3:
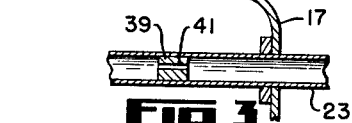
FIGURE 3 is an enlarged detailed view of a conduit restrictor employed in the invention to maintain a positive pressure within a gas supply line thereto.
Figure 2:
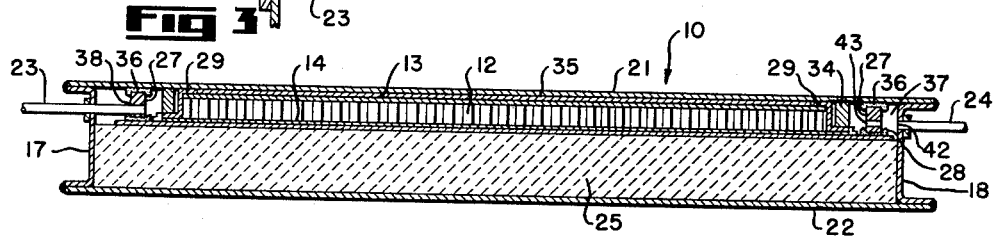
FIGURE 2 is a section taken along line II—II of FIGURE 1.

Inlet tube 23, which is associated with end wall 17 of external frame 10, admits argon gas to vacuum box 10, as will be later fully described, and extends, as shown in FIGURE 2, through an opening in end member 17, across interspace 37, to fit within a through aperture 38 in internal frame 27 for communication with the compartment defined thereby. Within inlet tube 23, in an exterior portion thereof closely adjacent box 10, is rigidly affixed a restrictor member 39, an enlarged view of which is shown in FIGURE 3. Restrictor 39 is of cylindrical form and has a through bore 41 and serves to maintain positive pressure in that portion of inlet tube 23 to the left of the restrictor so that should a break or leak occur in that tube portion the argon gas being drawn through tube 23 will leak out rather than having gases or air which may be exterior of tube 23 flow into the tube.

At the opposite end of vacuum brazing box 10 outlet tube 24 extends through an aperture 42 in end member 18 of external frame 15 and opens into interspace 37. Substantially in line with aperture 42 is another aperture 43 formed in frame 27 and of a diameter which is the same as that of bore 41 in restrictor 39; aperture 43 serves as an outlet for argon admitted through inlet tube 23.

Inlet tube 23 leads to and is suitably connected to a source (not shown) of pressurized inert gas, perferably argon, while outlet or vacuum line 24 extends to and is suitably connected to a conventional vacuum pump (not shown) of such capacity as will evacuate brazing box 10 at a rate greater than that at which argon gas is admitted through inlet tube 23, and since the argon gas is admitted into the area defined by internal frame 27, and the vacuum pump is connected with interspace 37, the pressure within the defined area is greater than that within the interspace. Therefore, there will be a continual seepage of argon from the area enclosed by frame 27 outwardly into interspace 37 through gas-permeable gaskets or pads 28 and 36.

Preferably the argon which is admitted to box 10 through inlet tube 23 is first filtered through a container (not shown) filled with titanium chips to render it substantially free of possible atmospheric contaminants.

Upper and lower vacuum sheets 21 and 22 which are disposed at opposite sides of panel 11 are, as above described, made of flexible material, so that when the vacuum pump is operated to effect a negative pressure within vacuum brazing box 10 the sheets 21 and 22 flex inwardly thereby applying a very evenly distributed compressive force upon sandwich panel 11.

It is understood that vacuum box 10 will be of proper size and dimension to accommodate the particular size and configuration of a panel to be brazed and that the flexible vacuum sheets 21 and 22 will be so located relative to the contained panel that desired pressure will be applied thereby to the panel components during the brazing operation.

Figure 4:
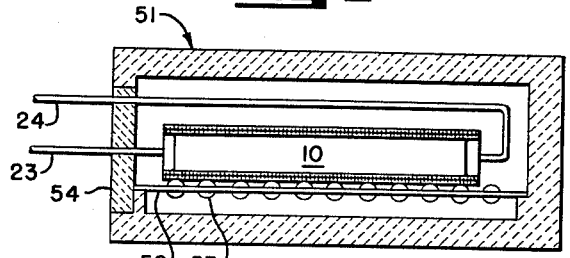
FIGURE 4 is a cross-sectional view of a conventional furnace, shown as containing the vacuum box, which is employed in carrying out the brazing operation of the invention.

After having placed panel 11 within a vacuum box 10 and having welded upper vacuum sheet 21 in place to directly overlie the flush surface on panel 11 the vacuum box 11 is placed within a suitable furnace 51 of a type capable of effecting a temperature of the order of 2000° F. Furnace 51, shown in FIGURE 4, is of convenient size and shape to readily receive box 10 and contains a rack 52 fitted with usual rollers 53 to facilitate insertion and removal of box 10. Furnace 51 has a front opening adapted to be sealably closed by a heavily insulated door 54 which is suitably removably securable in place. Furnace door 54 is suitably apertured to permit the passage therethrough of the inlet tube 23 and vacuum line 24 which tube and line are sealed at door 54 by means of conventional sealing glands (not shown).

After furnace 51 has been loaded and argon gas is being drawn through box 10 it is heated to brazing temperature.

In this heating atmospheric contaminants within the pores of brazing block 25 expand and are forced from such pores to flow into interspace 37 between the interior wall surfaces of external frame 15 and exterior wall surfaces of internal frame 27 from which space they are removed by way of vacuum line 24 without having touched panel 11. It is to be noted that should the welding of the vacuum sheets 21 and 22 by chance be defective and a leak should develop somewhere in the welding thereby to admit oxygen, nitrogen or other atmospheric contaminants, such contaminants also flow to interspace 37, from which they are removed by vacuum line 24 and without having contacted the panel workpiece 11.

It has been found that a desirable braze bond between the panel components is obtained by raising the temperature to 1815° F. and holding it thus for 15 minutes, then cooling to 1400° F. and holding for 90 minutes, then further cooling to 400° F.; each of these steps being accomplished while an inert or reducing atmosphere is maintained within the brazing box and shrouding the composite workpiece. It is apparent that drawing of a vacuum will cause vacuum sheet 21 to be pressed tightly against the flush upper surface of the workpiece to effect a uniform "hold-down" pressure on panel 11 throughout the brazing cycle. After the cooling to 400° F., the brazing box 10 is removed and cooled to room temperature in air, the upper vacuum sheet 21 is cut off with suitable tools and the panel 11 removed and refrigerated to −20° F. within 12 hours after leaving the 1400° F. temperature. This completes the transformation of the steel.

After the above steps have been performed, the panel 11 is cleaned and trimmed to the desired size and shape and is ready for use as a structural component of an aircraft or missile.

As a result of the high temperatures utilized in brazing, certain components of the brazing box 10 may warp and must be straightened or replaced before the brazing box 10 can be used again. After each brazing operation, upper welded vacuum sheet 21, as stated, is removed and the upper flanges of frame 15 are ground smooth along the line of weld. This being true, it is apparent that a small portion of the flanges is ground off each time and that frame 15 must be replaced periodically. Since the life expectancy of the box 10 may be forty to fifty cycles this entails no undue trouble or expense.

It is understood that this invention is not limited to any particular construction of furnace since any form of sealable furnace construction may be used which is readily loadable and which will achieve the desired brazing temperatures.

The herein described apparatus and method for braze bonding of metal cellular core to facing plates, edge members, doublers and other related elements to form sandwich panel constructions of various sizes and shapes wherein evenly distributed pressure is consistently applied to the combination of such elements and the density and composition of the workpiece's ambient atmosphere is controlled throughout the brazing operation constitutes an improved implement and method for production line manufacturing of composite, cellular cored sandwich panel constructions of exceptional strength/weight ratio, high structural integrity and optimum heat resistance and insulating qualities.

While only a preferred embodiment of the invention has been specifically disclosed, it is understood that the invention is not limited thereto, as many variations will be readily apparent to those skilled in the art and the invention is to be given its broadest possible interpretation within the terms of the following claims.

What I claim is:

1. Brazing apparatus for use in brazing metallic parts together, said brazing apparatus comprising an enclosure of airtight character for receiving metallic parts to be brazed, a supply line extending into the interior of said enclosure, a vacuum line communicating with the interior of said enclosure for use in drawing inert gas therethrough and producing a vacuum condition therein, said enclosure having at least one flexible wall portion adapted to exert a holding force upon said metallic parts upon production of a vacuum condition within said enclosure, and gas permeable means cooperable with said flexible wall within said enclosure defining a closed compartment having gas inlet and gas outlet apertures located in substantial opposition to each other for containing the metallic parts to be brazed, a space within said enclosure surrounding said gas permeable means, said supply line communicating through said gas inlet aperture with the interior of said closed compartment for introduction of insert gas thereinto, said vacuum line having communication with said space within the enclosure surrounding said gas permeable means for drawing said inert gas from said closed compartment through the gas outlet aperture thereof and through said space to the exterior of said enclosure and for withdrawing gaseous contaminants present in said space.

2. Brazing apparatus for use in brazing metallic parts together, said brazing apparatus comprising an enclosure of airtight character for receiving metallic parts to be brazed, a supply line extending into the interior of said enclosure, a vacuum line communicating with the interior of said enclosure for use in drawing inert gas therefrom and producing a vacuum condition therein, said enclosure having at least one flexible wall portion adapted to exert a holding force upon said metallic parts upon production of a vacuum condition within said enclosure, and removable gas permeable wall means within said enclosure defining a closed compartment for containing the metallic parts to be brazed, said wall means having a gas inlet aperture and a gas outlet aperture located in substantial opposition to each other, a space within said enclosure surrounding said wall means, said supply line communicating through said gas inlet aperture with the interior of said closed compartment for introduction of inert gas thereinto, said vacuum line having communication with said space within the enclosure surrounding said wall means of said closed compartment for drawing said inert gas from said closed compartment through said gas outlet aperture and through said space to the exterior of said enclosure and for withdrawing gaseous contaminants present in said space.

3. Brazing apparatus for use in brazing metallic parts together, said brazing apparatus comprising an enclosure of airtight character for receiving metallic parts to be brazed, a form block positioned within said enclosure with a cover sheet thereon upon which said metallic parts are disposed, a supply line extending into the interior of said enclosure, a vacuum line communicating with the interior of said enclosure for use in drawing inert gas therefrom and producing a vacuum condition therein, said enclosure having a flexible wall portion adapted to exert a holding force upon said metallic parts upon production of a vacuum condition within said enclosure, and removable gas permeable wall means within said enclosure extending between said cover sheet and said flexible wall portion to define a closed compartment for containing the metallic parts to be brazed, said wall means having a gas inlet aperture and a gas outlet aperture located in substantial opposition, said enclosure and said wall means defining a space within said enclosure surrounding said wall means, said supply line communicating through said gas inlet aperture with the interior of said closed compartment for introduction of inert gas thereinto, said vacuum line having communication with said space within the enclosure surrounding said wall means of the closed compartment for drawing said inert gas from said closed compartment through said gas outlet aperture and through said space to the exterior of said enclosure and for withdrawing gaseous contaminants present in said space.

4. Brazing apparatus for use in brazing metallic parts together, said brazing apparatus comprising an enclosure of airtight character for receiving metallic parts to be brazed, a form block positioned within said enclosure with a cover sheet thereon upon which said metallic parts are disposed, a supply line extending into the interior of said enclosure, a vacuum line communicating with the interior of said enclosure for use in drawing inert gas therefrom and producing a vacuum condition therein, said enclosure having a flexible wall portion adapted to exert a holding force upon said metallic parts upon production of a vacuum condition within said enclosure, and removable wall means within said enclosure extending between said cover sheet and said flexible wall portion to define a closed compartment for containing the metallic parts to be brazed, gas permeable gasket means peripherally positioned at opposite edges of said wall means between said edges and said cover and flexible wall portion, said wall means having a gas inlet aperture and a gas outlet aperture located in substantial opposition, a space within said enclosure surrounding said wall means and said gasket means, said supply line communicating through said gas inlet aperture with the interior of said closed compartment for introduction of inert gas thereinto, said vacuum line having communication with said space within the enclosure surrounding said wall means and gasket means for drawing said inert gas from said closed compartment through said gas outlet aperture and through said space to the exterior of said enclosure and for withdrawing gaseous contaminants present in said space.

5. Brazing apparatus for use in brazing metallic parts together, said brazing apparatus comprising an enclosure of airtight character for receiving metallic parts to be brazed, a supply line extending into the interior of said enclosure, restrictor means in an exterior portion of said supply line adjacent the enclosure for effecting a positive pressure in said supply line, a vacuum line communicating with the interior of said enclosure for use in drawing inert gas therefrom and producing a vacuum condition therein, said enclosure having at least one flexible wall portion adapted to exert a holding force upon said metallic parts upon production of a vacuum condition within said enclosure, and removable gas permeable wall means cooperable with said flexible wall within said enclosure defining a closed compartment for containing the metallic parts to be brazed, said wall means having a gas inlet aperture and a gas outlet aperture located in substantial opposition, said enclosure and said wall means defining a space within said enclosure surrounding said wall means, said supply line communicating through said gas inlet aperture with the interior of said closed compartment for introduction of inert gas thereinto, said vacuum line having communication with said space within said enclosure surrounding said wall means of said closed compartment for drawing said inert gas from said closed compartment through said gas outlet aperture and through said space to the exterior of said enclosure and for withdrawing gaseous contaminants present in said space.

6. Brazing apparatus for use in brazing together a structural sandwich comprising a metallic cellular core and top and bottom metallic skin sheets, said brazing apparatus comprising a metallic box like vessel having a base and side and end walls and being open at its top and having a flexible metallic cover for closing said open top to effect an air-tight structure for containing said structural sandwich, interior gas permeable wall means positioned in said vessel to define a space therebetween and the interior surfaces of the side and end walls of said vessel and surrounding said structural sandwich to define a closed compartment therefor, said interior wall means having a gas inlet aperture and a gas outlet aperture located in substantial opposition, a supply line for feeding inert gas extending through a wall of said vessel and through said gas inlet aperture of said interior wall means for communication with the interior of said closed compartment, and a vacuum line connected to said vessel for producing a vacuum condition in said vessel to cause said flexible cover to be inwardly drawn to exert a holding force upon the components of said structural sandwich, said vacuum line communicating with the space about said interior wall means for withdrawing said inert gas from said closed compartment through said gas outlet aperture and through said space to the exterior of said vessel and for withdrawing gaseous contaminants present in said space.

7. Brazing apparatus for use in brazing together a structural sandwich comprising a metallic cellular core and top and bottom metallic skin sheets, said brazing apparatus comprising an airtight metallic vessel having a base, walls, and a flexible metallic top wall, gas permeable means positioned within said vessel for defining a separate closed compartment therewithin and a space therebetween and the interior surfaces of the walls of said vessel, said closed compartment adapted to contain said structural sandwich and having a gas inlet aperture and a gas outlet aperture in communication with the interior of said closed compartment, a supply line for feeding inert gas extending through a wall of said vessel and through said gas inlet aperture for communication with the interior of said closed compartment, and a vacuum line connected to said vessel for producing a vacuum condition in said vessel to cause said flexible top wall to be drawn inwardly to exert a holding force upon the components of said structural sandwich, said vacuum line communicating with the space about said closed compartment for withdrawing said inert gas therefrom through said gas outlet aperture and through said space to the exterior of said vessel and for withdrawing gaseous contaminants present in said space.

8. Brazing apparatus for use in brazing together a structural sandwich comprising a metallic cellular core and top and bottom metallic skin sheets, said brazing apparatus comprising a metallic box like vessel having a base and side and end walls and being open at its top and having a flexible metallic cover for closing said open top to effect an airtight structure for containing said structural sandwich, a form block positioned within said vessel with a cover sheet thereon upon which said structural sandwich rests, interior gas permeable wall means positioned in said vessel to define a space therebetween and the interior surfaces of the side and end walls of said vessel, said interior wall means extending between said flexible cover and said cover sheet to define a closed compartment for said structural sandwich, reference tooling within said compartment for locating and maintaining the components of said structural sandwich in desirable relationship during a brazing operation, said interior wall means having a gas inlet aperture and a gas outlet aperture located in substantial opposition, a supply line for feeding inert gas extending through a wall of said vessel and through said gas inlet aperture of said interior wall means for communication with the interior of said closed compartment, and a vacuum line connected to said vessel for producing a vacuum condition in said vessel to cause said flexible cover to be inwardly drawn to exert a holding force upon the components of said structural sandwich, said vacuum line communicating with the space about said interior wall means for withdrawing said inert gas from said closed compartment through said gas outlet aperture and through said space to the exterior of said vessel and for withdrawing gaseous contaminants present in said space.

9. Brazing apparatus for use in brazing together a structural sandwich comprising a metallic cellular core and top and bottom metallic skin sheets, said brazing apparatus comprising a metallic box like vessel having a base and circumscribing walls and being open at its top and having a flexible metallic cover for closing said open top to effect an air-tight structure for containing said structural sandwich, a form block positioned within said vessel with a cover sheet thereon upon which said structural sandwich rests, interior gas permeable wall means positioned in said vessel to define a space therebetween and the interior surfaces of the side and end walls of said vessel, said interior wall means extending between said flexible cover and said cover sheet to define a closed compartment for said structural sandwich, reference tooling within said compartment for locating and maintaining the components of said structural sandwich in desirable relationship during a brazing operation, said interior wall means having a gas inlet aperture and a gas outlet aperture located in substantial opposition, a supply line for feeding inert gas extending through a wall of said vessel and through said gas inlet aperture of said interior wall means for communication with the interior of said closed compartment, restrictor means in said supply line in an exterior portion thereof adjacent said vessel, said restrictor means comprising a generally cylindrical member having a through bore of substantially the same diameter as the diameter of said gas outlet aperture of said interior wall, and a vacuum line connected to said vessel for producing a vacuum condition in said vessel to cause said flexible cover to be inwardly drawn to exert a holding force upon the components of said structural sandwich, said vacuum line communicating with the space about said interior wall means for withdrawing said inert gas from said closed compartment through said gas outlet aperture and through said space to the exterior of said vessel and for withdrawing gaseous contaminants present in said space.

10. The method of braze-bonding metallic parts together to form a structural member comprising installing said metallic component parts in assembled relationship and with interposed brazing material in an open-top brazing vessel, placing gas permeable wall means having gas inlet and gas outlet apertures located in substantial opposition to each other within said vessel in circumscribing relationship to said assembled metallic component parts to define a compartment for said metallic component parts and a space surrounding said wall means, extending a supply line into said compartment through said gas inlet aperture, communicating a vacuum line with said space, fixedly attaching a flexible cover to close said open-top of said brazing vessel to effect an air-tight construction and to close said compartment containing said metallic component parts, placing said brazing vessel with its contents in a furnace, supplying an inert gas through said supply line to said compartment, applying a vacuum through said vacuum line to said space to flow said inert gas through said compartment for exit through said gas outlet aperture and to remove gaseous contaminants present in said vessel, and heating and cooling said metallic component parts thereby to braze them together.

11. The method of braze-bonding sheet metal facing plates to opposite sides of a metallic cellular core to form a structural sandwich panel comprising applying a plate to each side of said core with brazing alloy therebetween, tack-brazing the assembly to hold it together, installing said assembly in an open-top brazing vessel together with reference tooling to locate said assembly within said vessel, placing a frame member having gas inlet and gas outlet apertures located in substantial opposition to each other on a gas permeable pad within said vessel in circumscribing relationship to said assembly to define a compartment for said assembly and a space surrounding said assembly, extending a supply line into said compartment through said gas inlet aperture, communicating a vacuum line with said space, fixedly attaching a flexible cover to close said open-top of said brazing vessel to effect an air-tight construction and to close said compartment containing said assembly, placing said brazing vessel with its contents in a furnace, supplying an inert gas through said supply line to said compartment, applying a vacuum through said vacuum line to said space to flow said inert gas through said gas outlet aperture and to remove gaseous contaminants present in said vessel, and heating and cooling said assembly to braze the components thereof together.

12. The method of braze-bonding sheet metal facing plates to opposite sides of a metallic core to form a structural sandwich panel comprising applying a plate to each side of said core with brazing alloy therebetween, tack-brazing the assembly to hold it together, installing said assembly in an open-top brazing vessel together with reference tooling to locate said assembly within said vessel, placing a frame member having gas inlet and gas outlet apertures located in substantial opposition to each other on a gas permeable pad within said vessel in circumscribing relationship to said assembly to define a compartment for said assembly and a space surrounding said assembly, extending a supply line into said compartment through said gas inlet aperture, communicating a vacuum line with said space, fixedly attaching a flexible cover to close said open-top of said brazing vessel to effect an airtight construction and to close said compartment containing said assembly, placing said brazing vessel with its contents in a furnace, supplying an inert gas through said supply line to said compartment, applying a vacuum through said vacuum line to said space, maintaining a pressure differential between the interior of said compartment and said space, and heating and cooling said assembly to braze the components thereof together.

References Cited by the Examiner

UNITED STATES PATENTS

| | | | |
|---|---|---|---|
| 2,095,807 | 10/37 | Gier | 29—494 X |
| 2,315,294 | 3/43 | Stewart et al. | 29—494 X |
| 2,713,196 | 7/55 | Brown | 29—494 X |
| 2,714,760 | 8/55 | Boam et al. | 29—494 X |
| 2,984,732 | 5/61 | Herbert. | |
| 3,067,507 | 12/62 | Titus | 113—99 X |
| 3,073,268 | 1/63 | Cole | 29—493 X |

JOHN F. CAMPBELL, *Primary Examiner.*